(12) United States Patent
Escale et al.

(10) Patent No.: US 12,286,492 B2
(45) Date of Patent: Apr. 29, 2025

(54) (METH) ACRYLIC POLYMERIC COMPOSITIONS FOR COMPOSITE, ITS METHOD OF PREPARATION AND USE

(71) Applicant: Arkema France, Colombes (FR)

(72) Inventors: Pierre Escale, Lacq (FR); Pierre Gerard, Lacq (FR); Dana Swan, Spring City, PA (US); Robert Barsotti, Newtown Square, PA (US); Nathan Bachman, West Chester, PA (US); Jing-Han Wang, King of Prussia, PA (US)

(73) Assignee: Arkema France, Puteaux (FR)

( * ) Notice: Subject to any disclaimer, the term of this patent is extended or adjusted under 35 U.S.C. 154(b) by 860 days.

(21) Appl. No.: 17/284,828

(22) PCT Filed: Oct. 15, 2019

(86) PCT No.: PCT/EP2019/077996
§ 371 (c)(1),
(2) Date: Apr. 13, 2021

(87) PCT Pub. No.: WO2020/079015
PCT Pub. Date: Apr. 23, 2020

(65) Prior Publication Data
US 2021/0388136 A1 Dec. 16, 2021

(30) Foreign Application Priority Data
Oct. 15, 2018 (FR) ..................................... 18.59537

(51) Int. Cl.
| | | |
|---|---|---|
| *C08F 220/14* | (2006.01) | |
| *B29B 15/12* | (2006.01) | |
| *C08J 5/24* | (2006.01) | |
| *B29C 70/52* | (2006.01) | |
| *B29K 33/00* | (2006.01) | |

(52) U.S. Cl.
CPC .......... *C08F 220/14* (2013.01); *B29B 15/122* (2013.01); *C08J 5/244* (2021.05); *C08J 5/249* (2021.05); *B29C 70/52* (2013.01); *B29K 2033/12* (2013.01); *C08F 2800/20* (2013.01)

(58) Field of Classification Search
CPC combination set(s) only.
See application file for complete search history.

(56) References Cited

U.S. PATENT DOCUMENTS

| | | | |
|---|---|---|---|
| 9,777,140 B2 | 10/2017 | Gerard et al. | |
| 10,294,358 B2 | 5/2019 | Gerard et al. | |
| 2003/0104743 A1* | 6/2003 | Weberg | C08F 4/38 523/210 |
| 2010/0119798 A1* | 5/2010 | Kirschbaum | C08F 265/04 428/220 |
| 2020/0115385 A1 | 4/2020 | Fontanier et al. | |

FOREIGN PATENT DOCUMENTS

| | | |
|---|---|---|
| CA | 2 839 915 | 7/2015 |
| JP | S54-97670 A | 8/1979 |
| JP | H09111085 A | 4/1997 |
| JP | 2011173969 | 9/2011 |
| JP | 2011173969 A2 | 9/2011 |

OTHER PUBLICATIONS

Calculations U.S. Appl. No. 17/284,828 (Year: 2024).*
International Search Report and Written Opinion (Forms PCT/ISA/210 and PCT/ISA/237) issued on Jan. 22, 2020, by the International Searching Authority in corresponding International Application No. PCT/EP2019/077996. (8 pages).

* cited by examiner

*Primary Examiner* — Peter A Salamon
(74) *Attorney, Agent, or Firm* — Buchanan Ingersoll & Rooney PC

(57) ABSTRACT

The present invention relates to a (meth)acrylic composition suitable for (meth)acrylic polymeric compositions and (meth)acrylic polymeric composites, its method of preparation and its use. In particular the present invention relates to a (meth)acrylic composition that is slightly crosslinked once polymerized and that is suitable for (meth)acrylic composites and more particular for rebars. More particularly the present invention relates to a (meth)acrylic composition suitable for rebars, preparing such a (meth)acrylic compositions, composite rebar comprising is and method of preparing such a composite rebar. The present invention also relates also to the use of such a (meth)acrylic composition and use of rebars.

19 Claims, No Drawings

(METH) ACRYLIC POLYMERIC COMPOSITIONS FOR COMPOSITE, ITS METHOD OF PREPARATION AND USE

This application claims benefit, under U.S.C. § 119 or § 365 of PCT Application Number PCT/EP2019/077996, filed Oct. 15, 2019, and French Patent Application Number FR18.59537, filed Oct. 15, 2018, these documents being incorporated herein by reference.

FIELD OF THE INVENTION

The present invention relates to a (meth)acrylic composition suitable for (meth)acrylic polymeric compositions and (meth)acrylic polymeric composites, its method of preparation and its use.

In particular the present invention relates to a (meth) acrylic composition that is slightly crosslinked once polymerized and that is suitable for (meth)acrylic composites and more particular for rebars.

More particularly the present invention relates to a (meth) acrylic composition suitable for rebars, preparing such a (meth)acrylic compositions, composite rebar comprising is and method of preparing such a composite rebar.

The present invention also relates also to the use of such a (meth)acrylic composition and use of rebars.

Technical Problem

A composite material is a macroscopic combination of two or more non miscible materials. The composite material constitutes at least of a matrix material that forms a continuous phase for the cohesion of the structure and a reinforcing material with various architectures for the mechanical properties.

The aim in using composite materials is to achieve a performance from the composite material that is not available from its separate constituents if used alone.

Consequently composite materials are widely used in several industrial sectors as for example building, automotive, aerospace, transport, leisure, electronics, and sport notably due to their better mechanical performance (higher tensile strength, higher tensile modulus, higher fracture toughness) in comparison with homogenous materials and their low density.

Thermosetting polymers consist of crosslinked three dimensional structures. The crosslinking is obtained by curing reactive groups inside the so called prepolymer. Curing for example can be obtained by heating the polymer chains in order to crosslink and harden the material permanently.

In order to prepare the polymeric composite material the prepolymer is mixed with the other component (for example glass beads for a particulate composite or short fibers for a fibrous composite) or the other component is wetted or impregnated (for example woven nets) and cured afterwards.

A disadvantage of a thermoset polymer matrix is its very high crosslinkage. The matrix cannot be shaped in other forms. Once the polymer has been cured the form is fixed.

Thermoplastic polymers consist of or compromise linear or branched polymer chains. The thermoplastic polymers are heated in order to mix the two constituents necessary for producing the composite material and to be cooled for setting. The limit in using thermoplastic polymers for the fabrication of composite materials is their high viscosity in the molten state. The wetting or correct impregnation of the fibers by the thermoplastic polymer can only be achieved, if the thermoplastic resin is sufficiently fluid. In order to have a low viscosity or sufficient fluidity of the thermoplastic polymer the chain length (molecular mass) can be reduced. However a too low molecular weight has a negative impact on the performance of the composite material especially the mechanical properties. On the other hand the temperature of the thermoplastic polymer could be increased in order to reduce the viscosity in an important way. Consequently the continuous working temperature is relatively high, above 200° C., influencing directly the economics (costs) of the composite material due to implication of high energy costs. Additionally thermoplastic polymers tend to degrade if the temperature is very high, which is especially true for semicrystalline thermoplastic polymers that have high melting points as for example polyamides (for example PA6.6), polyethersulfon (PES), polyetherimid (PEI), polyetheretherketon (PEEK) or polyphenylene sulfide (PPS). This thermo induced degradation yields to a decreasing molecular weight of the polymer matrix important for the cohesion of the composite material.

Another way for impregnating the fibrous substrate is to dissolve the thermoplastic polymer in an organic solvent. However this method requires a lot of solvent that has to be evaporated. There are environmental issues in using large quantities of solvent in term of energy and pollution.

In order to prepare a polymeric composite material based on thermoplastic polymer, a thermoplastic polymer resin, commonly known as a "syrup", is used to blend with or impregnate the reinforcing material, for example an filler or a fibrous substrate. Once polymerized, the thermoplastic polymeric syrup constitutes the matrix of the composite material. At the time of impregnation, when preparing polymeric composites, the viscosity of the impregnation syrup must be controlled and adapted so as not to be too fluid or too viscous, so as to impregnate correctly each fibre of the fibrous substrate. When the wetting is partial, depending on whether the syrup is too fluid or too viscous, "naked" zones, i.e. non-impregnated zones, and zones in which drops of polymer form on the fibres, which are the cause of the creation of bubbles, respectively appear. These "naked" zones and these bubbles give rise to the appearance of defects in the final composite material, which are the cause, inter alia, of a loss of mechanical strength of the final composite material. However the viscosity range useful for the impregnation is low for stocking such material.

In order to allow thermoforming and recycling, it is preferred to use thermoplastic polymers also in composite materials.

However one disadvantage of thermoplastic composite especially with fibrous reinforcements is the thermal stability. When a thermoplastic composite is thermoformed or exposed longer time at higher temperature some important characteristics change in an unfavorable manner as the decrease of the flexural strength retention and delamination at the polymer at the fibre interface.

There is a need of a composition for composites that can be thermoformed and provides a high thermal resistance.

The objective of the present invention is to have a composition for preparing a thermoplastic (meth)acrylic compositions with a high thermal resistance at increased temperatures.

The objective of the present invention is also to have a composition for preparing a thermoplastic composites composition with a high thermal resistance at increased temperatures.

High thermal resistance in the present invention signifies to reduce change of mechanical properties at a temperature over 140° C.

The further objective of the present invention is to have is to have a composition for preparing a thermoformable polymeric composites with a high thermal resistance. High thermal resistance in the present invention signifies also that delamination in the composite is at least strongly reduced.

Another objective of the present invention is to provide a process for preparing a (meth)acrylic composition for (meth) acrylic polymeric compositions or for preparing a (meth)acrylic composite composition with a high thermal resistance.

Still another objective of the present invention is to have a method for preparing a (meth)acrylic composite composition with a high thermal resistance.

BACKGROUND OF THE INVENTION

Prior Art

The document WO2013/056845 discloses a composite material via in-situ polymerization of thermoplastic (meth)acrylic resins. The polymeric composite material obtained by in-situ polymerization of a thermoplastic (meth)acrylic resin and a fibrous material containing long fibers and its use, a process for making such a composite material and manufactured mechanical or structured part or article comprising this polymeric composite material. The polymerization uses a radical initiator chosen from diacyl peroxides, peroxy esters, dialkyl peroxides, peroxyacetals or azo compounds. The document does not disclose anything about crosslinking after the polymerization of the polymer, obtained polymeric composite composition and its thermal resistance especially at elevated temperatures.

The document WO2014/013028 an impregnation process for a fibrous substrate, a liquid (meth) acrylic syrup for the impregnation process, its method of polymerization and structured article obtained thereof. The liquid (meth) acrylic syrup comprises a (meth)acrylic polymer, a (meth)acrylic monomer and at least one initiator or initiating system for starting the polymerization of the (meth) acrylic monomer. The initiators or initiating systems that are activated by heat. The document does not disclose anything about crosslinking after the polymerization of the polymer, obtained polymeric composite composition and its thermal resistance especially at elevated temperatures.

The document CA 2839915 discloses a bendable FRP rebar which comprises a thermoplastic material. The thermoplastic material can include PE, PS, PMMA, POM, PC, PSLU, PAI, PET, PEEK, PEK, PEI, PES PA6 and PA12. The rebar is consist of a flexible polyester.

All the prior art documents do not disclose a (meth)acrylic composition suitable for preparation of polymeric composition or composites that have improved thermal resistance.

BRIEF DESCRIPTION OF THE INVENTION

Surprisingly it has been found that a (meth)acrylic composition MC1 comprising:
a) 100 parts of a liquid (meth)acrylic syrup comprising
   a1) between 10 wt % and 50 wt % of a (meth)acrylic polymer (P1),
   a2) between 50 wt % and 90 wt % of a (meth)acrylic monomer (M1) comprising only one (meth)acrylic function, and
b) between 0.01 and 10 phr by weight of a (meth)acrylic monomer (M2) comprising at least two (meth)acrylic functions;

allows to provide a composition for the preparation of (meth)acrylic polymers or composites that possesses an improved thermal resistance as compared to a composition not comprising the component b).

Surprisingly it has also been discovered that a (meth)acrylic composition MC1 comprising:
a) 100 parts of a liquid (meth)acrylic syrup comprising
   a1) between 10 wt % and 50 wt % of a (meth)acrylic polymer (P1),
   a2) between 50 wt % and 90 wt % of a (meth)acrylic monomer (M1) comprising only one (meth)acrylic function, and
b) between 0.01 and 10 phr by weight of a (meth)acrylic monomer (M2) comprising at least two (meth)acrylic functions;

can be used to increase the thermal resistance of a polymer or polymeric composite made from that composition as compared to a composition not comprising the component b).

Surprisingly it has also been discovered that method for preparing a (meth)acrylic polymeric composition or for preparing a (meth)acrylic composite composition, said method comprises the steps of:
i) providing a (meth)acrylic composition MC1 comprising:
   a) 100 parts of a liquid (meth)acrylic syrup comprising
      a1) between 10 wt % and 50 wt % of a (meth)acrylic polymer (P1),
      a2) between 50 wt % and 90 wt % of a (meth)acrylic monomer (M1) comprising only one (meth)acrylic function, and
   b) between 0.01 and 10 phr by weight of a (meth)acrylic monomer (M2) comprising at least two (meth)acrylic functions;
ii) polymerizing said (meth)acrylic composition MC1 yields to a composition of (meth)acrylic polymers or composites that possess a better thermal resistance as compared to a composition not comprising the component b).

Surprisingly it has also been discovered that a process comprising the steps of:
i) providing a polymeric composite PC1 or part made of polymerized (meth)acrylic composition MC1,
ii) heating the polymeric composite PC1 or part
iii) transforming the polymeric composite PC1 or part yields to a process for transforming a polymeric composite PC1 or a polymeric composite parts, but also mechanical or structured parts or products, said process does not change its mechanical properties in an important manner once bended.

Surprisingly it has also been discovered that a method for preparing a polymeric composite PC1 from a (meth)acrylic composition MC1, said method comprises the following steps:
i) impregnating a fibrous substrate with the (meth)acrylic composition MC1 comprising:
   a) 100 parts of a liquid (meth)acrylic syrup comprising
      a1) between 10 wt % and 50 wt % of a (meth)acrylic polymer (P1),
      a2) between 50 wt % and 90 wt % of a (meth)acrylic monomer (M1) comprising only one (meth)acrylic function, and
   b) between 0.01 and 10 phr by weight of a (meth)acrylic monomer (M2) comprising at least two (meth)acrylic functions;

c) between 0.1 phr and 5 phr of a initiator (Ini) to start the polymerization of the (meth)acrylic monomer (M1) and (meth)acrylic comonomer (M2);
  ii) polymerizing the (meth)acrylic composition MC1;
yields to a polymeric composite PC1 that possess a better thermal resistance as compared to polymeric composite made from a composition not comprising the component b).

DETAILED DESCRIPTION OF THE INVENTION

According to a first aspect, the present invention relates to a (meth)acrylic composition MC1, said composition is comprising:
  a) 100 parts of a liquid (meth)acrylic syrup comprising
    a1) between 10 wt % and 50 wt % of a (meth)acrylic polymer (P1),
    a2) between 50 wt % and 90 wt % of a (meth)acrylic monomer (M1) comprising only one (meth)acrylic function, and
  b) between 0.01 and 10 phr by weight of a (meth)acrylic monomer (M2) comprising at least two (meth)acrylic functions.

According to a second aspect, the present invention relates to a (meth)acrylic composition (MC1) comprising:
  a) 100 parts of a liquid (meth)acrylic syrup comprising
    a1) between 10 wt % and 50 wt % of a (meth)acrylic polymer (P1),
    a2) between 50 wt % and 90 wt % of a (meth)acrylic monomer (M1) comprising only one (meth)acrylic function, and
  b) between 0.01 and 10 phr by weight of a (meth)acrylic monomer (M2) comprising at least two (meth)acrylic functions;
  c) optionally between 0.1 phr and 5 phr of a initiator (Ini) to start the polymerization of the (meth)acrylic monomer (M1) and (meth)acrylic comonomer (M2).

According to a third aspect the present invention relates to a method for preparing a (meth)acrylic composition MC1 comprising following steps:
  i) providing the following components
    a) a (meth)acrylic polymer (P1) and a (meth)acrylic monomer (M1) comprising only one (meth)acrylic function;
    b) a (meth)acrylic monomer (M2) comprising at least two (meth)acrylic functions;
    c) optionally adding between 0.1 phr and 5 phr of a initiator (Ini) to start the polymerization of the (meth)acrylic monomer (M1) and (meth)acrylic comonomer (M2); and
  ii) mixing the components a) to b or a) to c).

According to a fourth aspect the present invention relates to use of a (meth)acrylic composition MC1 to impregnate fibres or a fibrous substrate, said meth)acrylic composition MC1 comprises:
  a) 100 parts of a liquid (meth)acrylic syrup comprising
    a1) between 10 wt % and 50 wt % of a (meth)acrylic polymer (P1),
    a2) between 50 wt % and 90 wt % of a (meth)acrylic monomer (M1) comprising only one (meth)acrylic function, and
  b) between 0.01 and 10 phr by weight of a (meth)acrylic monomer (M2) comprising at least two (meth)acrylic functions;
  c) optionally between 0.1 phr and 5 phr of a initiator (Ini) to start the polymerization of the (meth)acrylic monomer (M1) and (meth)acrylic comonomer (M2).

According to a fifth aspect the present invention relates to a process for preparing a polymeric composite PC1 from a (meth)acrylic composition MC1, said method comprises the following steps:
  i) providing a (meth)acrylic composition MC1 comprising
    a) 100 parts of a liquid (meth)acrylic syrup comprising
      a1) between 10 wt % and 50 wt % of a (meth)acrylic polymer (P1),
      a2) between 50 wt % and 90 wt % of a (meth)acrylic monomer (M1) comprising only one (meth)acrylic function, and
    b) between 0.01 and 10 phr by weight of a (meth)acrylic monomer (M2) comprising at least two (meth)acrylic functions;
    c) optionally between 0.1 phr and 5 phr of a initiator (Ini) to start the polymerization of the (meth)acrylic monomer (M1) and (meth)acrylic comonomer (M2);
  ii) polymerizing the (meth)acrylic composition MC1 that has optionally impregnated fibres or fibrous substrate.

According to a sixth aspect the present the present invention relates to a method for preparing a polymeric composite PC1 from a (meth)acrylic composition MC1, said method comprises the following steps:
  i) impregnating a fibrous substrate with a (meth)acrylic composition MC1 comprising:
    a) 100 parts of a liquid (meth)acrylic syrup comprising
      a1) between 10 wt % and 50 wt % of a (meth)acrylic polymer (P1),
      a2) between 50 wt % and 90 wt % of a (meth)acrylic monomer (M1) comprising only one (meth)acrylic function, and
    b) between 0.01 and 10 phr by weight of a (meth)acrylic monomer (M2) comprising at least two (meth)acrylic functions;
    c) between 0.1 phr and 5 phr of a initiator (Ini) to start the polymerization of the (meth)acrylic monomer (M1) and (meth)acrylic comonomer (M2); and
  ii) polymerizing the (meth)acrylic composition MC1.

According to a seventh aspect the present the present invention relates to a process for transforming a polymeric composite PC1 or polymeric composite parts, but also mechanical or structured parts or products, said process comprises the steps of:
  i) providing a polymeric composite PC1 or part made from polymerizing a (meth)acrylic composition MC1, said composition is comprising:
    a) 100 parts of a liquid (meth)acrylic syrup comprising
      a1) between 10 wt % and 50 wt % of a (meth)acrylic polymer (P1),
      a2) between 50 wt % and 90 wt % of a (meth)acrylic monomer (M1) comprising only one (meth)acrylic function, and
    b) between 0.01 and 10 phr by weight of a (meth)acrylic monomer (M2) comprising at least two (meth)acrylic functions
  ii) heating the polymeric composite PC1 or part
  iii) transforming the polymeric composite PC1 or part.

By the term "(meth)acrylic" as used is denoted any kind of acrylic and methacrylic monomers.

By the term "PMMA" as used are denoted homo- and copolymers of methylmethacrylate (MMA), for the copolymer of MMA the weight ratio of MMA inside the PMMA is at least 70 wt %.

By the term "monomer" as used is denoted is a molecule which can under go polymerization.

By the term "polymerization" as used is denoted the process of converting a monomer or a mixture of monomers into a polymer.

By the term "thermoplastic polymer" as used is denoted a polymer that turns to a liquid or becomes more liquid or less viscous when heated and that can take on new shapes by the application of heat and pressure. This applies also for slightly crosslinked thermoplastic polymers that can be thermoformed when heated above the softening temperature.

By the term "thermosetting polymer" as used is denoted a prepolymer in a soft, solid or viscous state that changes irreversibly into an infusible, insoluble polymer network by curing.

By the term "polymer composite" as used is denoted a multicomponent material comprising multiple different phase domains in which at least one type of phase domain is a continuous phase and in which at least one component is a polymer.

By the term "rebar" as used is denoted a reinforcing bar that is used as a tension device in reinforced concrete and reinforced masonry structures to strengthen and aid the concrete under tension. Rebar significantly increases the tensile strength of concrete or the structure.

By the term "initiator" as used is denoted a chemical species that forms compound or an intermediate compound that starts the polymerization of a monomer, that to capable of linking successively with a large number of other monomers into a polymeric compound.

By the abbreviation "phr" is meant weight parts per hundred parts of composition. For example 1 phr of initiator in the composition means that 1 kg of initiator is added to 100 kg of composition.

By the abbreviation "ppm" is meant weight parts per million parts of composition. For example 1000 ppm of a compound in the composition means that 0.1 kg of compound is present in 100 kg of composition.

By saying that a range from x to y in the present invention, it is meant that the upper and lower limit of this range are included, equivalent to at least x and up to y.

By saying that a range is between x and y in the present invention, it is meant that the upper and lower limit of this range are excluded, equivalent to more than x and less than y.

The liquid composition a) or (meth)acrylic syrup according to the invention comprises a (meth)acrylic polymer (P1), a (meth)acrylic monomer (M1).

The liquid (meth)acrylic syrup according to the invention comprises between 10 wt % and 50 wt % of a (meth)acrylic polymer (P1) and between 50 wt % and 90 wt % of a (meth)acrylic monomer (M1). Preferably the liquid (meth)acrylic syrup comprises between 10 wt % and 40 wt % of a (meth)acrylic polymer (P1) and between 60 wt % and 90 wt % of a (meth)acrylic monomer (M1); and more preferably between 10 wt % and 30 wt % of a (meth)acrylic polymer (P1) and between 70 wt % and 90 wt % of a (meth)acrylic monomer (M1).

The dynamic viscosity of the liquid composition a) or (meth) acrylic syrup is in a range from 10 mPa*s to 10000 mPa*s, preferably from 20 mPa*s to 7000 mPa*s and advantageously from 20 mPa*s to 5000 mPa*s and more advantageously from 20 mPa*s to 2000 mPa*s and even more advantageously between 20 mPa*s and 1000 mPa*s. The viscosity of the syrup can be easily measured with a Rheometer or viscosimeter. The dynamic viscosity is measured at 25° C. If the liquid (meth) acrylic syrup has a Newtonian behaviour, meaning no shear thinning, the dynamic viscosity is independent of the shearing in a rheometer or the speed of the mobile in a viscometer. If the liquid composition LC1 has a non-Newtonian behaviour, meaning shear thinning, the dynamic viscosity is measured at a shear rate of 1 $s^{-1}$ at 25° C.

As regards the liquid composition a) of the invention it comprises a (meth)acrylic monomer (M1) and a (meth) acrylic polymer (P1). Once polymerized the (meth)acrylic monomer (M1) is transformed to a (meth)acrylic polymer (P2) comprising the monomeric units of (meth)acrylic monomer (M1) and other possible monomers.

Preferably dynamic viscosity of the (meth)acrylic composition MC1 is also in a range from 10 mPa*s to 10000 mPa*s, preferably from 20 mPa*s to 7000 mPa*s and advantageously from 20 mPa*s to 5000 mPa*s and more advantageously from 20 mPa*s to 2000 mPa*s and even more advantageously between 20 mPa*s and 1000 mPa*s.

As regards the (meth)acrylic polymer (P1), mention may be made of polyalkyl methacrylates or polyalkyl acrylates. According to a preferred embodiment, the (meth)acrylic polymer (P1) is polymethyl methacrylate (PMMA).

The term "PMMA" denotes a methyl methacrylate (MMA) homopolymer or copolymer or mixtures thereof.

According to one embodiment, the methyl methacrylate (MMA) homo- or copolymer comprises at least 70%, preferably at least 80%, advantageously at least 90% and more advantageously at least 95% by weight of methyl methacrylate.

According to another embodiment, the PMMA is a mixture of at least one homopolymer and at least one copolymer of MMA, or a mixture of at least two homopolymers or two copolymers of MMA with a different average molecular weight, or a mixture of at least two copolymers of MMA with a different monomer composition.

The copolymer of methyl methacrylate (MMA) comprises from 70% to 99.7% by weight of methyl methacrylate and from 0.3% to 30% by weight of at least one monomer containing at least one ethylenic unsaturation that can copolymerize with methyl methacrylate.

These monomers are well known and mention may be made especially of acrylic and methacrylic acids and alkyl (meth)acrylates in which the alkyl group contains from 1 to carbon atoms. As examples, mention may be made of methyl acrylate and ethyl, butyl or 2-ethylhexyl (meth)acrylate. Preferably, the comonomer is an alkyl acrylate in which the alkyl group contains from 1 to 4 carbon atoms.

According to a first preferred embodiment, the copolymer of methyl methacrylate (MMA) comprises from 80% to 99.9%, advantageously from 90% to 99.9% and more advantageously from 90% to 99.9% by weight of methyl methacrylate and from 0.1% to 20%, advantageously from 0.1% to 10% and more advantageously from 0.1% to 10% by weight of at least one monomer containing at least one ethylenic unsaturation that can copolymerize with methyl methacrylate. Preferably, the comonomer is chosen from methyl acrylate and ethyl acrylate, and mixtures thereof.

The weight-average molecular mass of the (meth)acrylic polymer (P1) should be high, which means greater than 50 000 g/mol and preferably greater than 100 000 g/mol.

The weight-average molecular mass can be measured by size exclusion chromatography (SEC).

The (meth)acrylic polymer (P1) is fully soluble in the (meth)acrylic monomer (M1) or in the mixture of (meth) acrylic monomers. It enables the viscosity of the (meth) acrylic monomer (M1) or the mixture of (meth)acrylic monomers to be increased. The solution obtained is a liquid composition generally called a "syrup" or "prepolymer".

The dynamic viscosity value of the liquid (meth)acrylic syrup is between 10 mPa·s and 10 000 mPa·s. The viscosity of the syrup can be readily measured with a rheometer or a viscometer. The dynamic viscosity is measured at 25° C.

Advantageously, the liquid (meth)acrylic composition or syrup contains no additional voluntarily added solvent.

As regards the (meth)acrylic monomer (M1), the monomer is chosen from alkyl acrylic monomers, alkyl methacrylic monomers, hydroxyalkyl acrylic monomers and hydroxyalkyl methacrylic monomers, and mixtures thereof.

Preferably, the (meth)acrylic monomer (M1) is chosen from hydroxyalkyl acrylic monomers, hydroxyalkyl methacrylic monomers, alkyl acrylic monomers, alkyl methacrylic monomers and mixtures thereof, the alkyl group containing from 1 to 22 linear, branched or cyclic carbons; the alkyl group preferably containing from 1 to 12 linear, branched or cyclic carbons.

More preferably, the (meth)acrylic monomer (M1) is chosen from alkyl acrylic monomers or alkyl methacrylic monomers and mixtures thereof, the alkyl group containing from 1 to 22 linear, branched or cyclic carbons; the alkyl group preferably containing from 1 to 12 linear, branched or cyclic carbons.

Advantageously, the (meth)acrylic monomer (M1) is chosen from methyl methacrylate, ethyl methacrylate, methyl acrylate, ethyl acrylate, methacrylic acid, acrylic acid, n-butyl acrylate, isobutyl acrylate, n-butyl methacrylate, isobutyl methacrylate, cyclohexyl acrylate, cyclohexyl methacrylate, isobornyl acrylate, isobornyl methacrylate, hydroxyethyl acrylate and hydroxyethyl methacrylate, and mixtures thereof.

More advantageously, the (meth)acrylic monomer (M1) is chosen from methyl methacrylate, ethyl methacrylate, methyl acrylate, ethyl acrylate, methacrylic acid, acrylic acid, n-butyl acrylate, isobutyl acrylate, n-butyl methacrylate, isobutyl methacrylate, cyclohexyl acrylate, cyclohexyl methacrylate, isobornyl acrylate, isobornyl methacrylate, and mixtures thereof.

According to a preferred embodiment, at least 50% by weight and preferably at least 60% by weight of the (meth) acrylic monomer (M1) is methyl methacrylate.

According to a first more preferred embodiment, at least 50% by weight, preferably at least 60% by weight, more preferably at least 70% by weight, advantageously at least 80% by weight and even more advantageously 90% by weight of the monomer (M1) is a mixture of methyl methacrylate with optionally at least one other monomer.

As regards the (meth)acrylic monomer (M2), the monomer is multifunctional. Preferably the (meth)acrylic monomer (M2) is chosen from a compound comprising at least two (meth)acrylic functions. The (meth)acrylic monomer (M2) can also be chosen from a mixture of at least two compounds (M2a) and (M2b) each respectively comprising at least two (meth)acrylic functions.

The (meth)acrylic monomer (M2) can be chosen from 1,3-butylene glycol dimethacrylate; 1,4-butanediol dimethacrylate; 1,6 hexanediol diacrylate; 1,6 hexanediol dimethacrylate; diethylene glycol dimethacrylate; dipropylene glycol diacrylate; ethoxylated (10) bisphenol a diacrylate; ethoxylated (2) bisphenol a dimethacrylate; ethoxylated (3) bisphenol a diacrylate; ethoxylated (3) bisphenol a dimethacrylate; ethoxylated (4) bisphenol a diacrylate; ethoxylated (4) bisphenol a dimethacrylate; ethoxylated bisphenol a dimethacrylate; ethoxylated (10) bisphenol dimethacrylate; ethylene glycol dimethacrylate; polyethylene glycol (200) diacrylate; polyethylene glycol (400) diacrylate; polyethylene glycol (400) dimethacrylate; polyethylene glycol (400) dimethacrylate; polyethylene glycol (600) diacrylate; polyethylene glycol (600) dimethacrylate; polyethylene glycol 400 diacrylate; propoxylated (2) neopentyl glycol diacrylate; tetraethylene glycol diacrylate; tetraethylene glycol dimethacrylate; tricyclodecane dimethanol diacrylate; tricyclodecanedimethanol dimethacrylate; triethylene glycol diacrylate; triethylene glycol dimethacrylate; tripropylene glycol diacrylate; ethoxylated (15) trimethylolpropane triacrylate; ethoxylated (3) trimethylolpropane triacrylate; ethoxylated (6) trimethylolpropane triacrylate; ethoxylated (9) trimethylolpropane triacrylate; ethoxylated 5 pentaerythritol triacrylate; ethoxylated (20) trimethylolpropane triacrylate; propoxylated (3) glyceryl triacrylate; trimethylolpropane triacrylate; propoxylated (5.5) glyceryl triacrylate; pentaerythritol triacrylate; propoxylated (3) glyceryl triacrylate; propoxylated (3) trimethylolpropane triacrylate; trimethylolpropane triacrylate; trimethylolpropane trimethacrylate; tris(2-hydroxy ethyl) isocyanurate triacrylate; di-trimethylolpropane tetraacrylate; dipentaerythritol pentaacrylate; ethoxylated (4) pentaerythritol tetraacrylate; pentaerythritol tetraacrylate; dipentaerythritol hexaacrylate; 1,10 decanediol diacrylate; 1,3-butylene glycol diacrylate; 1,4-butanediol diacrylate; 1,9-nonanediol diacrylate; 2-(2-Vinyloxyethoxy)ethyl acrylate; 2-butyl-2-ethyl-1,3-propanediol diacrylate; 2-methyl-1,3-propanediol diacrylate; 2-methyl-1,3-propanediyl ethoxy acrylate; 3 methyl 1,5-pentanediol diacrylate; alkoxylated cyclohexane dimethanol diacrylate; alkoxylated hexanediol diacrylate; cyclohexane dimethanol diacrylate; ethoxylated cyclohexane dimethanol diacrylate; diethyleneglycol diacrylate; dioxane glycol diacrylate; ethoxylated dipentaerythritol hexaacrylate; ethoxylated glycerol triacrylate; ethoxylated neopentyl glycol diacrylate; hydroxypivalyl hydroxypivalate diacrylate; neopentyl glycol diacrylate; poly (tetramethylene glycol) diacrylate; polypropylene glycol 400 diacrylate; polypropylene glycol 700 diacrylate; propoxylated (6) ethoxylated bisphenol A diacrylate; propoxylated ethylene glycol diacrylate; propoxylated (5) pentaerythritol tetraacrylate; and propoxylated trimethylol propane triacrylate Preferably the (meth)acrylic monomer (M2) is chosen from ethylene glycol dimethacrylate, neopentyl glycol diacrylate, neopentyl glycol dimethacrylate, 1,4-butanediol dimethacrylate, 1,4-butanediol diacrylate, 1,3-butylene glycol diacrylate, 1,3-butylene glycol dimethacrylate, triethylene glycol dimethacrylate and triethylene glycol diacrylate or mixtures thereof.

The (meth)acrylic monomer (M2) can be present in (meth)acrylic composition MC1 between 0.01 and 10 phr by weight, preferably is present between 0.1 and 9.5 phr for 100 parts of a liquid (meth)acrylic syrup, more preferably between 0.1 and 9 phr, even more preferably between 0.1 and 8.5 phr and advantageously between 0.1 and 8 phr.

In a first more preferred embodiment the (meth)acrylic monomer (M2) is present in (meth)acrylic composition MC1 between 0.01 and 9 phr and is chosen from a compound comprising two (meth)acrylic functions.

In a second more preferred embodiment the (meth)acrylic monomer (M2) is present in (meth)acrylic composition MC1 between 0.01 and 9 phr and is chosen from a mixture of compounds comprising two (meth)acrylic functions.

In a third more preferred embodiment the (meth)acrylic monomer (M2) is present in (meth)acrylic composition MC1 between 0.01 and 9 phr and is chosen from a mixture of compounds comprising at least two (meth)acrylic functions.

In a fourth more preferred embodiment the (meth)acrylic monomer (M2) is present in (meth)acrylic composition MC1 between 0.01 and 9 phr and is chosen from a mixture of compounds comprising at least two (meth)acrylic functions. At least one compound of the mixture comprises only two (meth)acrylic functions and presents at least 50 wt % of the mixture of (meth)acrylic monomer (M2), preferably at least 60 wt %. The other compound of the mixture comprises more than two (meth)acrylic functions.

As regards the initiator (Ini) to start the polymerization of the (meth)acrylic monomers (M1) and (M2), it is chosen from a radical initiator.

Preferably the initiator (Ini) is activated by heat.

The radical initiators (Ini) can be chosen from a peroxy group comprising compound or an azo group comprising compounds and preferably from a peroxy group comprising compound.

Preferably the peroxy group comprising compound comprises from 2 to 30 carbon atoms.

Preferably the peroxy group comprising compound is chosen from diacyl peroxides, peroxy esters, peroxydicarbonates, dialkyl peroxides, peroxyacetals, hydroperoxide or peroxyketale.

The initiator (Ini) is chosen from diisobutyryl peroxide, cumyl peroxyneodecanoate, di(3-methoxybutyl) peroxydicarbonate, 1,1,3,3-Tetramethylbutyl peroxyneodecanoate, cumyl peroxyneoheptanoate, di-n-propyl peroxydicarbonate, tert-amyl peroxyneodecanoate, di-sec-butyl peroxydicarbonate, diisopropyl peroxydicarbonate, di(4-tert-butylcyclohexyl) peroxydicarbonate, di-(2-ethylhexyl)-peroxydicarbonate, tert-amyl peroxyneodecanoate, tert-butyl peroxyneodecanoate, di-n-butyl peroxydicarbonate, dicetyl peroxydicarbonate, dimyristyl peroxydicarbonate, 1,1,3,3-tetramethylbutylperoxypivalate, tert-butyl peroxyneoheptanoate, tert-amyl peroxypivalate, tert-butyl peroxypivalate, di-(3,5,5-trimethylhexanoyl)-peroxide, dilauroyl peroxide, didecanoyl peroxide, 2,5-dimethyl-2,5-di(2-ethylhexanoylperoxy)-hexane, 1,1,3,3-tetramethylbutyl peroxy-2-ethylhexanoate, tert-amyl peroxy-2-ethylhexanoate, dibenzoyl peroxide, tert-butyl peroxy-2-ethylhexanoate, tert-butyl peroxydiethylacetate, tert-butyl peroxyisobutyrate, 1,1-di-(tert-butylperoxy)-3,3,5-trimethylcyclohexane, 1,1-di(tert-amylperoxy)cyclohexane, 1,1-di-(tert-butylperoxy)-cyclohexane, tert-amyl peroxy-2-ethylhexylcarbonate, tert-amyl peroxyacetate, tert-butyl peroxy-3,5,5-trimethylhexanoate, 2,2-di-(tert-butylperoxy)-butane, tert-butyl peroxyisopropylcarbonate, tert-butyl peroxy-2-ethylhexylcarbonate, tert-amyl peroxybenzoate, tert-butyl peroxyacetate, butyl 4,4-di(tert-butylperoxy)valerate, tert-butyl peroxybenzoate, di-tert-amylperoxide, dicumyl peroxide, di-(2-tert-butyl-peroxyisopropyl)-benzene, 2,5-dimethyl-2,5-di-(tert-butylperoxy)-hexane, tert-butylcumyl peroxide, 2,5-dimethyl-2,5-di(tert-butylperoxy)hexyne-3, di-tert-butyl peroxide, 3,6,9-triethyl-3,6,9-trimethyl-1,4,7-triperoxonane, 2,2'-azobis-isobutyronitrile (AIBN), 2,2'-azodi-(2-methylbutyronitrile), azobisisobutyramide, 2,2'-azobis(2,4-dimethylvaleronitrile), 1,1'-Azodi(hexahydrobenzonitrile), or 4,4'-azobis(4-cyanopentanoic).

Preferably the initiator (Ini) is chosen from cumyl peroxyneodecanoate, di(3-methoxybutyl) peroxydicarbonate, 1,1,3,3-tetramethylbutyl peroxyneodecanoate, cumyl peroxyneoheptanoate, di-n-propyl peroxydicarbonate, tert-amyl peroxyneodecanoate, di-sec-butyl peroxydicarbonate, diisopropyl peroxydicarbonate, di(4-tert-butylcyclohexyl) peroxydicarbonate, di-(2-ethylhexyl)-peroxydicarbonate, tert-amyl peroxyneodecanoate, tert-butyl peroxyneodecanoate, di-n-butyl peroxydicarbonate, dicetyl peroxydicarbonate, dimyristyl peroxydicarbonate, 1,1,3,3-tetramethylbutylperoxypivalate, tert-butyl peroxyneoheptanoate, tert-amyl peroxypivalate, tert-butyl peroxypivalate, di-(3,5,5-trimethylhexanoyl)-peroxide, dilauroyl peroxide, didecanoyl peroxide, 2,5-dimethyl-2,5-di(2-ethylhexanoylperoxy)-hexane or 1,1,3,3-tetramethylbutyl peroxy-2-ethylhexanoate.

As regards the fibrous substrate, mention may be made of several fibres, uni directional rovings or continuous filament mat, fabrics, felts or nonwovens that may be in the form of strips, laps, braids, locks or pieces. The fibrous material may have various forms and dimensions, either one-dimensional, two-dimensional or three-dimensional. A fibrous substrate comprises an assembly of one or more fibres. When the fibres are continuous, their assembly forms fabrics.

The one-dimensional form corresponds to linear long fibres. The fibres may be discontinuous or continuous. The fibres may be arranged randomly or parallel to each other, in the form of a continuous filament. A fibre is defined by its aspect ratio, which is the ratio between the length and diameter of the fibre. The fibres used in the present invention are long fibres or continuous fibres. The fibres have an aspect ratio of at least 1000, preferably at least 1500, more preferably at least 2000, advantageously at least 3000 and more advantageously at least 5000, even more advantageously at least 6000, more advantageously still at least 7500 and most advantageously at least 10 000.

The two-dimensional form corresponds to nonwoven or woven fibrous mats or reinforcements or bundles of fibres, which may also be braided. Even if the two-dimensional form has a certain thickness and consequently in principle a third dimension, it is considered as two-dimensional according to the present invention.

The three-dimensional form corresponds, for example, to nonwoven fibrous mats or reinforcements or stacked or folded bundles of fibres or mixtures thereof, an assembly of the two-dimensional form in the third dimension.

The origins of the fibrous material may be natural or synthetic. As natural material one can mention plant fibres, wood fibres, animal fibres or mineral fibres.

Natural fibres are, for example, sisal, jute, hemp, flax, cotton, coconut fibres, and banana fibres. Animal fibres are, for example, wool or hair.

As synthetic material, mention may be made of polymeric fibres chosen from fibres of thermosetting polymers, of thermoplastic polymers or mixtures thereof.

The polymeric fibres may consist of polyamide (aliphatic or aromatic), polyester, polyvinyl alcohol, polyolefins, polyurethanes, polyvinyl chloride, polyethylene, unsaturated polyesters, epoxy resins and vinyl esters.

The mineral fibres may also be chosen from glass fibres, especially of E, R or S2 type, carbon fibres, boron fibres or silica fibres.

The fibrous substrate of the present invention is chosen from plant fibres, wood fibres, animal fibres, mineral fibres, synthetic polymeric fibres, glass fibres and carbon fibres, and mixtures thereof.

Preferably, the fibrous substrate is chosen from mineral fibres. More preferably the fibrous substrate is chosen from glass fibres or carbon fibres.

The fibres of the fibrous substrate have a diameter between 0.005 μm and 100 μm, preferably between 1 μm and 50 μm, more preferably between 5 μm and 30 μm and advantageously between 10 μm and 25 μm.

Preferably, the fibres of the fibrous substrate of the present invention are chosen from continuous fibres (meaning that the aspect ratio does not necessarily apply as for long fibres) for the one-dimensional form, or for long or continuous fibres for the two-dimensional or three-dimensional form of the fibrous substrate.

The present the present invention relates additionally to a method for preparing a polymeric composite PC1 from a (meth)acrylic composition MC1, said method comprises the following steps:
  i) impregnating fibres or a fibrous substrate with the (meth)acrylic composition MC1 comprising:
    a) 100 parts of a liquid (meth)acrylic syrup comprising
      a1) between 10 wt % and 50 wt % of a (meth)acrylic polymer (P1),
      a2) between 50 wt % and 90 wt % of a (meth)acrylic monomer (M1) comprising only one (meth)acrylic function, and
    b) between 0.01 and 10 phr by weight of a (meth)acrylic monomer (M2) comprising at least two (meth)acrylic functions;
    c) between 0.1 phr and 5 phr of a initiator (Ini) to start the polymerization of the (meth)acrylic monomer (M1) and (meth)acrylic comonomer (M2);
  ii) polymerizing the (meth)acrylic composition MC1, that has impregnated the fibres or fibrous substrate.

The components a) to c) in the method for preparing a polymeric composite are the same as defined before and their respective weight ratios.

The polymerization step takes place at a temperature typically below 140° C., preferably below 130° C. and even more preferably below 125° C.

Preferably the polymerization step takes place at temperature between 40° C. and 140° C., preferably between 50° C. and 130° C., even more preferably between 60° C. and 125° C.

The polymeric composite PC1 is preferably a (meth)acrylic polymeric composite.

The polymeric composite PC1 is preferably fibre reinforced polymeric composite.

The present the present invention relates additionally to a process for manufacturing ppolymeric composite parts, but also mechanical or structured parts or products, from the (meth)acrylic composition MC1. The process for manufacturing polymeric composite parts includes the method for preparing the polymeric composite PC1 from a (meth)acrylic composition MC1.

As regards the process for manufacturing polymeric composite parts, but also mechanical or structured parts or products, or the method for preparing the polymeric composite PC1 from a (meth)acrylic composition MC1; various processes could be used for preparing these parts. Mention may be made of vacuum assisted resin infusion (VARI), pultrusion, vacuum bag molding, pressure bag molding, autoclave molding, resin transfer molding (RTM) and variations thereof as (HP-RTM, C-RTM, I-RTM), reaction injection molding (RIM), reinforced reaction injection molding (R-RIM) and variants thereof, press molding, compression molding, liquid compression molding (LCM) or sheet molding compound (SMC) or bulk molding compound (BMC).

A first preferred manufacturing process for manufacturing composite parts or the method for preparing the polymeric composite PC1 from a (meth)acrylic composition MC1; are processes according to which the liquid composition is transferred to the fibrous substrate by impregnation of the fibrous substrate in a mold. The processes requiring a mold a listed above and comprise the wording molding.

A second preferred manufacturing process for manufacturing composite parts or the method for preparing the polymeric composite PC1 from a (meth)acrylic composition MC1; are processes according to which the liquid composition is used in pultrusion process. The fibres are guided through a resin batch comprising the composition according to the invention. The fibres as fibrous substrate are for example in form of a unidirectional roving or a continuous filament mat. After impregnation in the resin bath the wetted fibres are pulled through a heated die, where polymerization takes place.

A third preferred manufacturing process or the method for preparing the polymeric composite PC1 from a (meth)acrylic composition MC1 is vacuum assisted resin infusion (VARI).

The process for manufacturing composite parts, but also mechanical or structured parts or products or the method for preparing the polymeric composite PC1 from a (meth)acrylic composition MC1; can additionally comprise the step of post forming or transforming. The post forming includes bending as changing the form of the composite part.

The process for manufacturing composite parts, but also mechanical or structured parts or products, can additionally comprise the step of welding or gluing or laminating.

The thermoplastic composite parts obtained from the processes or method according to the invention can be post formed after polymerization of the liquid composition of the invention. The forming includes bending as changing the form of the composite.

The thermoplastic parts or manufactured composite parts obtained after polymerization of the liquid composition of the invention and/or from the processes according to the invention can be welded, glued or laminated.

The present the present invention relates additionally to a process for transforming the polymeric composite PC1 or the polymeric composite parts, but also mechanical or structured parts or products, said process comprises the steps of:
  i) providing a polymeric composite PC1 or part
  ii) heating the polymeric composite PC1 or part
  iii) transforming the polymeric composite PC1 or part.

Under transforming is understood that the polymeric composite PC1 changes its form during the transformation step. After the transformation step the form of the polymeric composite PC1 is different from the provided polymeric composite PC1 before the heating step The transformation can for example be twisting, bending, curving or folding.

The temperature of the heating step is at least 120° C. and preferably at least 140° C.

In an exemplified embodiment of the process for transforming a polymeric composite PC1 or the polymeric composite parts, but also mechanical or structured parts or products, said process comprises the steps of:
  i) providing a polymeric composite PC1 in form of a rebar
  ii) heating the rebar
  iii) bending the rebar.

As regards the use of the mechanical parts made of composite material thus manufactured, mention may be made of automotive applications, transport applications such as buses or lorries, nautical applications, railroad applications, sport, aeronautic and aerospace applications, photovoltaic applications, computer-related applications, construction and building applications, telecommunication applications and wind energy applications.

The mechanical part made of composite material is especially a motor vehicle part, boat part, bus part, train part, sport article, plane or helicopter part, space ship or rocket part, photovoltaic module part, a material for construction or building for example composite rebars, dowels and stirrups for civil engineering and high rise construction, wind turbine part for example spar cap of girder of wind turbine blade, furniture part, construction or building part, telephone or cellphone part, computer or television part, or printer or photocopier part.

In a first preferred embodiment the mechanical part made of composite material is especially a material for construction or building for example composite rebars, dowels and stirrups for civil engineering and high rise construction.

In a second preferred embodiment the mechanical part made of composite material is especially a wind turbine part for example a spar cap of girder of wind turbine blade.

In one specific embodiment the manufactured composite part is a bendable rebar. The rebar is used in concrete.

EXAMPLES

Comparative example 1: A syrup S1 is prepared by dissolving parts by weight of the PMMA (BS520 a copolymer of MMA comprising ethyl acrylate as a comonomer) in 75 parts by weight of methyl methacrylate, which is stabilized with MEHQ (hydroquinone monomethyl ether). Syrup S1 is used to prepare the composition of the examples of the invention by adding additional compounds.

Example 1. A syrup S2 is prepared from syrup S1 by adding 2 parts 1,4-butanediol dimethacrylate to the 100 parts by weight of the syrup S1.

Example 2: A syrup S3 is prepared from syrup S1 by adding 2 parts of ethylene glycol dimethacrylate to the 100 parts by weight of the syrup S1.

Each of the respective syrups S1 to S3 is blended with 2 phr of initiator di(4-tert-butylcyclohexyl) peroxydicarbonate (P16-Perkadox® 16 from the company Akzo Nobel) relative to the syrup part, which are added as polymerization initiators. The respective compositions are mixed in order to obtain a homogenous composition. The respective compositions are put under vacuum for degasing at 21° C.

A glass fabric is infused under vacuum with each syrup.

Polymerization takes place in a convection oven at 80° C. Three composite materials are obtained based on the respective syrups.

The thermal resistance is evaluated on each of the three molded compounds. Therefor the samples are put in a ventilated oven at 200° C. for 15 min and the flexural strength is measured for each sample and compared to a non-treated sample.

TABLE 1

| | Results | |
|---|---|---|
| | Max stress/[MPa] | |
| | Not treated | 200° C. |
| Comparative example 1 | 1080 | 250 |
| Example 1 | 1070 | 840 |
| Example 2 | 1210 | 1170 |

The thermal resistance for the samples according to the invention is much better, they show nearly no or much lesser loss of flexural strength.

The invention claimed is:
1. A (meth)acrylic composition MC1 comprising,
  a) 100 parts of a liquid (meth)acrylic syrup comprising
    a1) between 10 wt % and 50 wt % of a (meth)acrylic polymer (P1), wherein the (meth)acrylic polymer (P1) is a polymethyl methacrylate selected from the group consisting of a mixture of at least one homopolymer and at least one copolymer of methyl methacrylate, a mixture of at least two homopolymers or two copolymers of methyl methacrylate with a different average molecular weight, and a mixture of at least two copolymers of methyl methacrylate with a different monomer composition,
    a2) between 50 wt % and 90 wt % of a (meth)acrylic monomer (M1) comprising only one (meth)acrylic function, and
  b) between 0.01 and 10 phr by weight of a (meth)acrylic comonomer (M2) comprising at least two (meth)acrylic functions;
  c) from 2 phr and below 5 phr of an initiator (Ini) to start the polymerization of the (meth)acrylic monomer (M1) and (meth)acrylic comonomer (M2),
  wherein the initiator (Ini) is chosen from a peroxy comprising compound.

2. The (meth)acrylic composition MC1 according to claim 1, wherein the (meth)acrylic comonomer (M2) is selected from the group consisting of 1,3-butylene glycol dimethacrylate; 1,4-butanediol dimethacrylate; 1,6 hexanediol diacrylate; 1,6 hexanediol dimethacrylate; diethylene glycol dimethacrylate; dipropylene glycol diacrylate; ethoxylated (10) bisphenol A diacrylate; ethoxylated (2) bisphenol A dimethacrylate; ethoxylated (3) bisphenol A diacrylate; ethoxylated (3) bisphenol A dimethacrylate; ethoxylated (4) bisphenol A diacrylate; ethoxylated (4) bisphenol A dimethacrylate; ethoxylated bisphenol A dimethacrylate; ethoxylated (10) bisphenol dimethacrylate; ethylene glycol dimethacrylate; polyethylene glycol (200) diacrylate; polyethylene glycol (400) diacrylate; polyethylene glycol (400) dimethacrylate; polyethylene glycol (400) dimethacrylate; polyethylene glycol (600) diacrylate; polyethylene glycol (600) dimethacrylate; polyethylene glycol 400 diacrylate; propoxylated (2) neopentyl glycol diacrylate; tetraethylene glycol diacrylate; tetraethylene glycol dimethacrylate; trieyelodecane dimethanol diacrylate; tricyclodecanedimethanol dimethacrylate; triethylene glycol diacrylate; triethylene glycol dimethacrylate; tripropylene glycol diacrylate; ethoxylated (15) trimethylolpropane triacrylate; ethoxylated (3) trimethylolpropane triacrylate; ethoxylated (6) trimethylolpropane triacrylate; ethoxylated (9) trimethylolpropane triacrylate; ethoxylated 5 pentaerythritol triacrylate; ethoxylated (20) trimethylolpropane triacrylate; propoxylated (3) glyceryl triacrylate; trimethylolpropane triacrylate; propoxylated (5.5) glyceryl triacrylate; pentaerythritol triacrylate; propoxylated (3) glyceryl triacrylate; propoxylated (3) trimethylolpropane triacrylate; trimethylolpropane triacrylate; trimethylolpropane trimethacrylate; tris (2-hydroxy ethyl) isocyanurate triacrylate; di-trimethylolpropane tetraacrylate; dipentaerythritol pentaacrylate; ethoxylated (4) pentaerythritol tetraacrylate; pentaerythritol tetraacrylate; dipentaerythritol hexaacrylate; 1,10 decanediol diacrylate; 1, 3-butylene glycol diacrylate; 1, 4-butanediol diacrylate; 1, 9-nonanediol diacrylate; 2-(2-Vinyloxyethoxy) ethyl acrylate; 2-butyl-2-ethyl-1, 3-propanediol diacrylate; 2-methyl-1, 3-propanediol diacrylate; 2-methyl-1, 3-propanediyl ethoxy acrylate; 3 methyl 1, 5-pentanediol diacrylate; alkoxylated cyclohexane dimethanol diacrylate; alkoxylated hexanediol diacrylate; cyclohexane dimethanol diacrylate; ethoxylated cyclohexane dimethanol diacrylate; diethyleneglycol diacrylate; dioxane glycol diacrylate; ethoxylated dipentaerythritol hexaacrylate; ethoxylated glycerol triacrylate; ethoxylated neopentyl glycol diacrylate; hydroxypivalyl hydroxypivalate diacrylate; neopentyl glycol diacrylate; poly (tetramethylene glycol) diacrylate; polypropylene glycol 400 diacrylate; polypropylene glycol 700 diacrylate; propoxylated (6) ethoxylated bisphenol A diacrylate; propoxylated ethylene glycol diacrylate; propoxylated (5) pentaerythritol tetraacrylate; and propoxylated trimethylol propane triacrylate; and mixtures thereof.

3. The (meth)acrylic composition MC1 according to claim 1, wherein the (meth)acrylic comonomer (M2) is selected from the group consisting of ethylene glycol dimethacrylate, neopentyl glycol diacrylate, neopentyl glycol dimethacrylate, 1,4-butanediol dimethacrylate, 1,4-butanediol diacrylate, 1,3-butylene glucol diacrylate, 1,3-butylene glycol dimethacrylate, triethylene glycol dimethacrylate, and triethylene glycol diacrylate.

4. The (meth)acrylic composition MC1 according to claim 1, wherein the (meth)acrylic monomer (M1) is selected from the group consisting of alkyl acrylic monomers or alkyl methacrylic monomers and mixtures thereof, the alkyl group containing from 1 to 22 linear, branched or cyclic carbons.

5. The (meth)acrylic composition MC1 according to claim 1, wherein the (meth)acrylic monomer (M1) is at least 50% by weight methyl methacrylate.

6. The (meth)acrylic composition MC1 according to claim 1, wherein the peroxy group comprising compound is selected from the group consisting of diacyl peroxides, peroxy esters, peroxydicarbonates, dialkyl peroxides, peroxyacetals, hydroperoxide and peroxyketale.

7. The (meth)acrylic composition MC1 according to claim 1, wherein the liquid (meth)acrylic syrup comprises
   a1) between 10 wt % and 30 wt % of a (meth)acrylic polymer (Pl), and
   a2) between 70 wt % and 90 wt % of a (meth)acrylic monomer (M1) comprising only one (meth)acrylic function.

8. The (meth)acrylic composition MC1 according to claim 1, wherein the (meth)acrylic comonomer (M2) is present between 0.1 and 9.5 phr for 100 parts of a liquid (meth)acrylic syrup.

9. The (meth)acrylic composition MC1 according to claim 1, wherein the (meth)acrylic comonomer (M2) is present in said (meth)acrylic composition MC1 between 0.01 and 9 phr and is chosen from one or more compounds comprising two (meth)acrylic functions.

10. The (meth)acrylic composition MC1 according to claim 1, wherein the (meth)acrylic monomer (M2) is present in the (meth)acrylic composition MC1 between 0.01 and 9 phr and is chosen from a mixture of compounds comprising at least two (meth)acrylic functions wherein at least one compound of the mixture comprises only two (meth)acrylic functions and comprises at least 50 wt % of the mixture of (meth)acrylic monomer (M2).

11. A method for preparing a polymeric composite PC1, said process is comprising the following steps:
   i) impregnating fibres or a fibrous substrate with the (meth)acrylic composition MC1 according to claim 1;
   ii) polymerizing the (meth)acrylic composition MC1 that has impregnated the fibres or fibrous substrate.

12. The method according to claim 11, wherein the polymerization step takes place at temperature between 40° C. and 140° C.

13. A process for transforming a polymeric composite PC1 or polymeric composite parts, said process comprises the steps of:
   i) providing a polymeric composite PC1 or part made from polymerizing a (meth)acrylic composition MC1 according to claim 1;
   ii) heating the polymeric composite PC1 or part
   iii) transforming the polymeric composite PC1 or part.

14. The process according to claim 13, wherein the temperature of the heating step is at least 120° C.

15. The process according to claim 13, wherein the transforming is twisting, bending, curving or folding.

16. The process according to claim 13, wherein the polymeric composite PC1 is in form of a rebar.

17. The process according to claim 13, wherein the said process comprises the steps of:
   i) providing a polymeric composite PC1 in form of a rebar
   ii) heating the rebar
   ii) bending the rebar.

18. The process according to claim 11, wherein said composite is in the form of rebar.

19. The process according to claim 18, wherein the process is made by pultrusion.

* * * * *